US012611664B2

(12) United States Patent
Cowe

(10) Patent No.: US 12,611,664 B2
(45) Date of Patent: Apr. 28, 2026

(54) TEST DEVICE

(71) Applicant: Owen Mumford Limited, Woodstock (GB)

(72) Inventor: Toby Cowe, Woodstock (GB)

(73) Assignee: OWEN MUMFORD LIMITED, Woodstock (GB)

( * ) Notice: Subject to any disclaimer, the term of this patent is extended or adjusted under 35 U.S.C. 154(b) by 761 days.

(21) Appl. No.: 17/924,471

(22) PCT Filed: May 11, 2021

(86) PCT No.: PCT/EP2021/062426
§ 371 (c)(1),
(2) Date: Nov. 10, 2022

(87) PCT Pub. No.: WO2021/228819
PCT Pub. Date: Nov. 18, 2021

(65) Prior Publication Data

US 2023/0182129 A1 Jun. 15, 2023

(30) Foreign Application Priority Data

May 14, 2020 (GB) ..................................... 2007121

(51) Int. Cl.
*B01L 3/00* (2006.01)

(52) U.S. Cl.
CPC ......... *B01L 3/5023* (2013.01); *B01L 2200/16* (2013.01); *B01L 2300/047* (2013.01); *B01L 2300/069* (2013.01); *B01L 2400/0406* (2013.01)

(58) Field of Classification Search
CPC ............... B01L 3/5023; B01L 2200/16; B01L 2300/047; B01L 2300/069;
(Continued)

(56) References Cited

U.S. PATENT DOCUMENTS 5,100,620 A 3/1992 Brenneman
5,145,565 A 9/1992 Kater et al.
(Continued)

FOREIGN PATENT DOCUMENTS

WO 2004038414 A1 5/2004
WO 2011113114 A1 9/2011
WO 2019071323 A1 4/2019

OTHER PUBLICATIONS

International Search Report and Written Opinion of the International Searching Authority from corresponding PCT Application No. PCT/EP2021/062426 date of mailing Aug. 30, 2021 (12 pages).
(Continued)

*Primary Examiner* — Jennifer Wecker
*Assistant Examiner* — Steven Ray Castaneda
(74) *Attorney, Agent, or Firm* — QUARLES & BRADY LLP

(57) ABSTRACT

Aspects of the present invention relate to a test device comprising a housing configured to receive a test component, an inlet, integral with the housing, configured to receive body fluid; and a reservoir in fluid communication with the inlet and the test component. The inlet may be integral with the housing. Optionally the reservoir may comprise a recess in the upper wall of the housing and being in fluid communication with the inlet and the test component. Alternatively, the housing may comprise a projection from an upper wall of the housing extending into a cavity formed by the housing such that it contacts the test component to direct fluid from the reservoir along at least a part of the test component.

13 Claims, 1 Drawing Sheet

(58) Field of Classification Search
CPC ........... B01L 2400/0406; B01L 3/5027; B01L 2200/10; B01L 2300/06; B01L 2300/0609; B01L 2300/0809; B01L 2300/0819; B01L 2300/0848; A61B 5/150343; A61B 5/150358; A61B 5/150022; A61B 5/150007; A61B 5/150206
See application file for complete search history.

(56) References Cited

U.S. PATENT DOCUMENTS

| | | | |
|---|---|---|---|
| 5,165,419 | A | 11/1992 | Sarstedt |
| 6,860,873 | B2 | 3/2005 | Allen et al. |
| 10,881,342 | B2 | 1/2021 | Kelly et al. |
| 2004/0096957 | A1 | 5/2004 | Allen et al. |
| 2006/0205086 | A1* | 9/2006 | Hu .................. G01N 33/54388 436/514 |
| 2012/0277697 | A1 | 11/2012 | Haghgooie et al. |
| 2014/0272941 | A1 | 9/2014 | Gunnerson et al. |
| 2017/0022550 | A1 | 1/2017 | Moore et al. |
| 2019/0001320 | A1* | 1/2019 | Huang ............... G01N 33/5438 |
| 2019/0317115 | A1 | 10/2019 | Maclean et al. |

OTHER PUBLICATIONS

European Patent Office, Communication pursuant to Article 94(3) EPC issued for corresponding European Patent Application No. 21726854.9 dated Dec. 11, 2024 [5 pgs].

Combined Search and Examination Report under Sections 17 and 18(3) from corresponding Great Britain Application No. GB2007121.3, dated Nov. 13, 2020 (10 pages).

Simplitude, "Instructions for use" [online], [date unknown] Owen Mumford Ltd. Available from https://simplitudebyme.com/wp-content/uploads/sites/9/2020/04/Simplitude_Instructions-for-use-EN.pdf [accessed Dec. 27, 2022] (2 pages).

Simplitude, "Simplitude By Me" [online], Apr. 24, 2020, Owen Mumford Ltd., Available from: https://www.facebook.com/SimplitudeByMe/videos/owmbymefinaleditvideosnippet6/580339552841220/ [accessed Dec. 27, 2022] (2 pages).

* cited by examiner

TEST DEVICE

CROSS-REFERENCE TO RELATED APPLICATIONS

This application represents the U.S. National Stage of International Application No. PCT/EP2021/062426 filed May 11, 2021, which claims priority to United Kingdom Patent Application Serial No. GB 2007121.3, filed May 14, 2020 all of which are incorporated herein by reference in their entirety.

TECHNICAL FIELD

The present disclosure relates to a test device. In particular, it relates to a lateral flow test device.

BACKGROUND

It is known to provide tests which allow relatively immediate results to the user. These include home tests, tests for points of care and tests used within a professional setting such as a hospital. For example, U.S. Pat. No. 6,860,873 describes using a hollow needle to draw blood to a reservoir in order to effect a test on the blood. U.S. Pat. No. 6,860,873 describes a similar device where a test strip is used to test blood which is received in a reservoir.

SUMMARY OF THE INVENTION

Aspects and embodiments of the invention provide a test device as claimed in the appended claims.

According to an aspect of the present invention there is provided a test device comprising, a housing configured to receive a test component, an inlet, integral with the housing, configured to receive body fluid and a reservoir in fluid communication with the inlet and the test component. The inlet may be a capillary tube.

The reservoir may comprise a recess in the upper wall of the housing. Optionally, the surface area of the reservoir is equal to or less than an area that can be covered by the volume of body fluid required by the test component. This allows a user to readily determine, by viewing the reservoir whether sufficient body fluid has been received by the test device.

Optionally, the test component is received below the reservoir. This placement of the test component assists delivery of the body fluid to the test component. Further, the test component may form a lower boundary of the reservoir allowing direct application of the body fluid to the test component. This further assists delivery of the body fluid to the test component and may reduce the amount of test solution required to be delivered to the test device.

The boundary of the reservoir formed by the upper wall of the housing may forms at least one projection extending into the inner cavity of the housing. The projection may be provided with an opening positioned over the test component and/or extend at least partially along the test component. There may be provided a second projection extending from an upper wall of the housing which extends into the cavity of the housing and, in use, contacts the test component. The projection or second projection may carry out one or more functions. For example, the projection may apply pressure to the test component thereby assisting securing the test component in place within the housing. Further the projection may extend to increase the volume of the reservoir to enable the volume of body fluid required by the test component to be received by the reservoir. Additionally, the projection may be shaped to direct the body fluid along the test component. This may be useful, for example, if the test component is a lateral flow test which relies on movement of body fluid along the test component in a particular direction.

According to another aspect of the present invention there is provided a test device comprising a housing configured to receive a test component, an inlet, configured to receive body fluid; and a reservoir comprising a recess in the upper wall of the housing and being in fluid communication with the inlet and the test component.

The surface area of the reservoir may be equal to or less than an area that can be covered by the volume of body fluid required by the test component. This allows a user to readily determine, by viewing the reservoir whether sufficient body fluid has been received by the test device. The test component may be received below the reservoir and further may form a lower boundary of the reservoir.

The boundary of the reservoir formed by the upper wall of the housing may forms at least one projection extending into the inner cavity of the housing. The projection may be provided with an opening positioned over the test component and/or extend at least partially along the test component.

The test device may be provided with a further projection from an upper wall of the housing which extends into the cavity of the housing and, in use, contacts the test component.

According to a further aspect of the present invention there is provided a test device comprising a housing configured to receive a test component, an inlet, configured to receive body fluid and a reservoir in fluid communication with the inlet and the test component wherein the housing comprises a projection from an upper wall of the housing extending into a cavity formed by the housing such that it contacts the test component to direct fluid from the reservoir along at least a part of the test component.

The boundary of the reservoir formed by the upper wall of the housing may forms at least one projection extending into the inner cavity of the housing. The projection may be provided with an opening positioned over the test component and/or extend at least partially along the test component.

The reservoir may comprise a recess in the upper wall of the housing. Optionally, the surface area of the reservoir is equal to or less than an area that can be covered by the volume of body fluid required by the test component. This allows a user to readily determine, by viewing the reservoir whether sufficient body fluid has been received by the test device.

Optionally, the test component is received below the reservoir. This placement of the test component assists delivery of the body fluid to the test component. Further, the test component may form a lower boundary of the reservoir allowing direct application of the body fluid to the test component. This further assists delivery of the body fluid to the test component and may reduce the amount of test solution required to be delivered to the test device.

In a test device according to any aspect of the invention the inlet may be integral to the housing. Optionally, the inlet may be a capillary tube.

Further, in a test device according to any aspect of the invention the test device may include to elevate an end of the housing comprising the inlet. This elevation further assists delivery of the body fluid along the test component. This may be of particular use, for example, when the test component is a lateral flow test.

BRIEF DESCRIPTION OF THE DRAWINGS

One or more embodiments of the invention will now be described, by way of example only, with reference to the accompanying drawings, in which.

DETAILED DESCRIPTION

Figure 1:
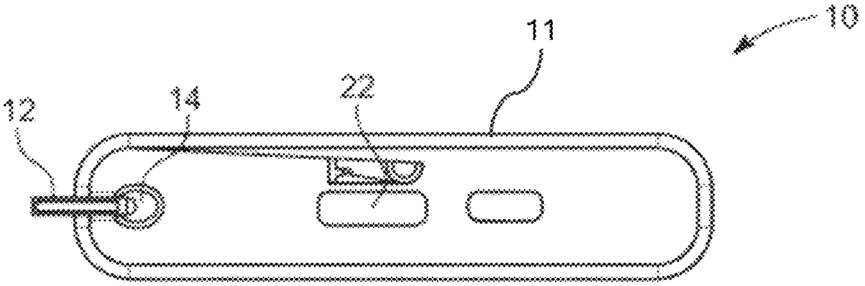
FIG. 1 shows a top view of a test device according to the present invention.
Figure 2:
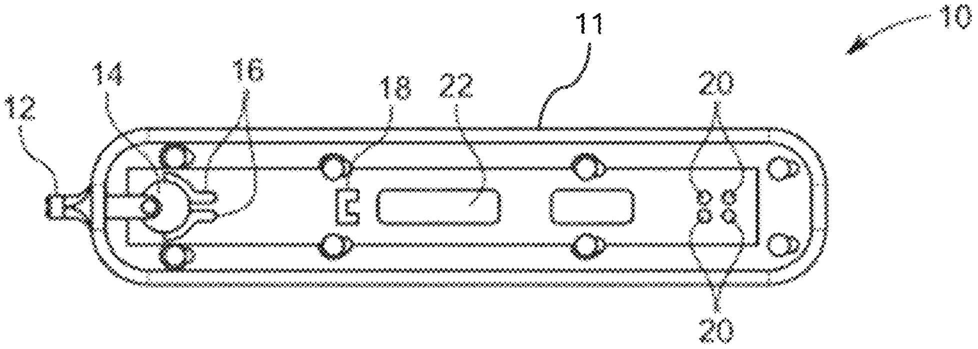
FIG. 2 shows the underside of the top wall of a housing of the test device shown in FIG. 1.
Figure 3:
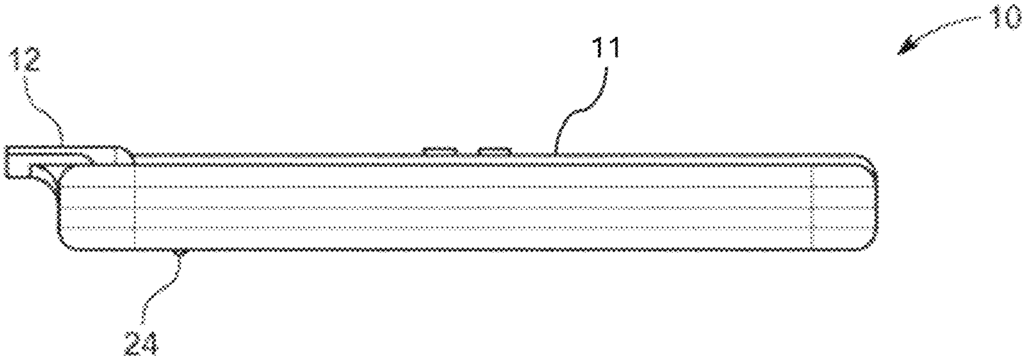
FIG. 3 shows a side view of the housing of the test device shown in FIG. 1.

A test device according to an embodiment of the present invention is described herein with reference to FIGS. 1 to 3.

With reference to FIG. 1, the test device 10 comprises an inlet 12 in the form of a capillary tube to receive body fluid from a user. A reservoir 14 is in fluid communication with the inlet and is positioned above an area to receive a portion of a test component (not shown). The capillary tube is in fluid communication with the reservoir 14 and directs the body fluid received by the capillary tube into the reservoir 14.

For example, the end of the capillary tube in fluid communication with the reservoir is positioned above the reservoir 14. The end of the capillary tube 12 bends around a ninety degree angle to direct fluid from the capillary tube that is in a plane above the reservoir 14 into the reservoir 14. Although the end of the capillary tube illustrated in the figures is ninety degrees it will be understood that any suitable angle may be used to provide delivery of the body fluid reservoir. Additionally, if desired the capillary tube may be in positioned in the same horizontal plane as the reservoir.

Although the present capillary tube is illustrated as having a circular cross-section with a break in the upper wall of the capillary tube so that it forms an open channel any suitable cross section and configuration of tube may be used to facilitate movement of body fluid from a user or receptacle to the reservoir.

Referring now to FIG. 2, it can be seen that the lower surface of the upper portion of the housing 11 has projections 16 which extend from the sides of the reservoir 14. These projections 16 extend into the housing 11 and contact the test component when it is present in the housing. Thus, they can increase the volume of body fluid received by the reservoir 14 as opposed to the standard depth of the wall of the housing 11. As can be seen, in the present embodiment, two projections 16 are provided either side of the edge of the reservoir 14. They extend from the side of the reservoir longitudinally away from the inlet in order to assist the flow of the body fluid away from the inlet along the test component.

Additional projections 18 and 20 to contact the test may be provided at any desired position along the housing 11. Through the pressure that they apply to the test component the projections may help to assist the flow of the body fluid along the test component and/or help secure the test component within the housing 11.

It will be understood that the projections 16, 18 and 20 may take any suitable configuration required. For example, the depth of the projections extending from the sides of the reservoir may be varied in order that the volume required to cover the surface of the reservoir is equal or more than the amount of body fluid required by the test component. This provides an additional advantage that, when the body fluid is opaque, such as blood the user can readily see from viewing the reservoir that sufficient body fluid has been provided for the test.

The upper wall of the housing is also provided with at least one window 22 through which the results of the test can be viewed.

Referring now to FIG. 3, the test device is provided with two projections 24 from the lower wall of the housing 11. The projections are located at the end of the housing nearest the inlet 12. The projections act to raise the end of the end of the housing nearest the inlet 12 relative to the end of the housing furthest from the inlet 12. This elevation further assists delivery of the body fluid along the test component. This may be of particular use, for example, when the test component is a lateral flow test. The skilled person will understand that any suitably shaped or positioned projections may be provided. For example, a single projection extending substantially along the width of the housing. Additionally any suitable height of elevation may be provided in order to encourage the desired flow rate along the test component.

In use, a user obtains a sample of body fluid. For example, the body fluid may be blood and a user may use a lancet to release blood from a site on the body such as a finger.

The user may need to milk the blood from the lanced site. Once the blood has been released the capillary tube of the test device is brought into contact with the blood and withdraws by capillary action a sample.

As blood enters the capillary tube it moves through the tube to the reservoir where it collects. As discussed previously the surface of the reservoir may provide an indication that sufficient blood has been collected. In such an instance the test device can be removed from the site on the body when sufficient blood has been collected.

Once sufficient blood has been collected a test fluid can be added to the reservoir. The test fluid is selected to facilitate the flow of the body fluid or components of the body fluid down the test component. Once the test fluid has been added flow of the body fluid down the test component is further facilitated by the projections from the upper wall of the housing into the housing.

The test component may be, for example, a lateral flow test or any other type of test where flow of a test sample is controlled such as a chromatographic test. The test fluid may be any suitable fluid required to control movement of the body fluid in the test. For example, the test fluid may be water or a buffer solution.

It will be understood that the present invention may be used to perform a test on any suitable body fluid. Examples of such body fluids include but are not limited to, urine, interstitial fluid, faeces, or sputum, whether directly applied to the test unit or after pre-processing.

The test may be a test for a component of blood, electrolyte, blood sugar, cholesterol or any other blood component. It may adapted to detect specific biological or immunological responses, for example the presence of a pathogen or antibodies to a pathogen. Any kind of test on a body fluid which is suitable for this type of test unit can be used.

It should be understood that the detailed description and specific examples are given by way of illustration only, since various changes and modifications within the spirit and scope of the disclosure will become apparent to those skilled in the art from the description.

The invention claimed is:

1. A test device comprising:

a) a housing configured to receive a test component;

b) an inlet comprising a capillary tube, integral with the housing, configured to receive body fluid; and c) a reservoir in fluid communication with the inlet and the test component, wherein a lower surface of an upper portion of the housing comprises projections extending from either side of an edge of the reservoir longitudinally away from the inlet, wherein the projections are configured to contact the test component when the test component is present in the housing such that fluid is configured to flow longitudinally from the reservoir along at least part of the test component.

2. A test device as claimed in claim 1 wherein the reservoir comprises a recess in an upper wall of the housing.

3. A test device as claimed in claim 2 wherein the surface area of the reservoir is equal to or less than an area that can be covered by the volume of body fluid required by the test component.

4. A test device as claimed in claim 2 wherein the housing is configured to receive the test component-below the reservoir.

5. A test device as claimed in claim 4 wherein the housing is configured such that, in use, the test component forms a lower boundary of the reservoir.

6. A test device as claimed in claim 2 wherein a boundary of the reservoir formed by the upper wall of the housing forms at least one projection extending into an inner cavity of the housing.

7. A test device as claimed in claim 6 wherein the projection is provided with an opening positioned over the test component.

8. A test device as claimed in claim 6 wherein the projection extends at least partially along the test component.

9. A test device as claimed claim 1 comprising a projection from an upper wall of the housing which extends into a cavity of the housing and, in use, contacts the test component.

10. A test device as claimed in claim 1, wherein the projection extends from at least part of a boundary of the reservoir formed by the upper portion of the housing.

11. A test device as claimed in claim 10 wherein the projection is provided with an opening positioned over the test component.

12. A test device as claimed in claim 1 comprising means to elevate an end of the housing comprising the inlet.

13. A test device as claimed in claim 12 wherein the means comprises at least one projection from a lower wall of the housing.

* * * * *